United States Patent [19]

Debely

[11] Patent Number: 4,647,405

[45] Date of Patent: Mar. 3, 1987

[54] BORIDE-ALUMINA COMPOSITE

[75] Inventor: Pierre E. Debely, Geneva, Switzerland

[73] Assignee: ELTECH Systems Corporation, Boca Raton, Fla.

[21] Appl. No.: 529,303

[22] Filed: Sep. 3, 1983

[51] Int. Cl.$^4$ .............. C04B 35/58; C04B 35/10
[52] U.S. Cl. .................. 252/518; 501/96; 501/98; 252/520
[58] Field of Search .......... 501/96, 98; 252/518, 252/520

[56] References Cited

U.S. PATENT DOCUMENTS

| | | | |
|---|---|---|---|
| 2,270,607 | 1/1942 | Ryschkewitsch | 501/153 |
| 3,067,146 | 12/1962 | Rubin | 501/127 |
| 3,143,413 | 8/1964 | Krapf | 75/233 |
| 3,296,002 | 3/1967 | Hare | 501/96 |
| 4,022,584 | 5/1977 | Rudy | 501/98 |
| 4,110,260 | 8/1978 | Yamamoto et al. | 501/87 |
| 4,343,909 | 8/1982 | Adams et al. | 501/98 |
| 4,379,852 | 4/1983 | Watanabe et al. | 501/87 |
| 4,528,121 | 7/1985 | Matsushita et al. | 252/516 |
| 4,540,475 | 9/1985 | DeAngelis | 501/98 |

Primary Examiner—Mark L. Bell
Attorney, Agent, or Firm—John J. Freer

[57] ABSTRACT

A dense essentially non-porous composite ceramic material of a diboride of group IVa metal, preferably titanium, and alumina in a 3:5 mole ratio has a macroscopically uniform structure made up of non-uniformly dispersed agglomerates of alumina of random shapes and dimensions and a fibrous sponge-like electrically conductive structure of submicronic grains of the group IVa metal boride in intimate wetting contact with the alumina agglomerates. The material is made by reaction hot pressing of coarse grain precursor powders.

3 Claims, 1 Drawing Figure

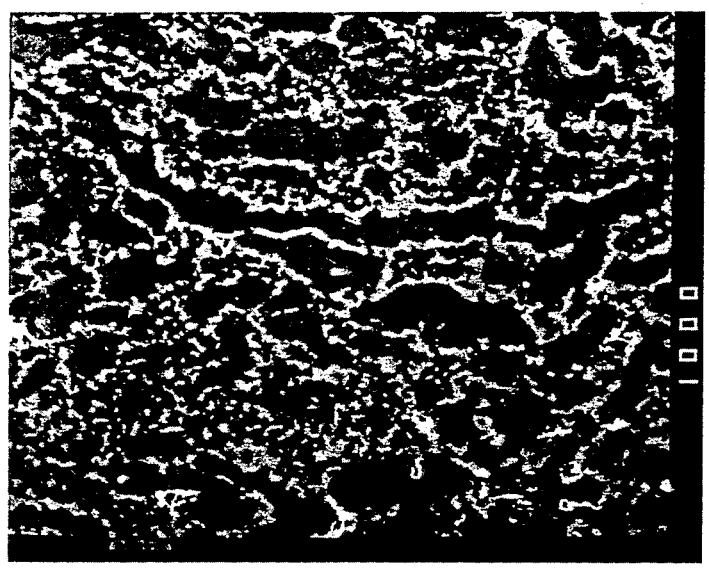

BORIDE-ALUMINA COMPOSITE

TECHNICAL FIELD

The invention relates to a composite ceramic material of a diboride of a group IVa metal (titanium, zirconium, hafnium) and alumina and to a method of producing the composite.

BACKGROUND ART

Boride ceramics are of great technological importance primarily because of their hardness and wear resistance. They possess higher oxidation stability in gaseous and liquid reactive media than corresponding pure metals and alloys. Several fabrication methods are known to produce boride materials, such as sintering, hot pressing, plasma spraying of $TiB_2$ powder or chemical vapour deposition. The production of bulk borides involves the use of expensive $TiB_2$ powder. The sintering of $TiB_2$ powder is usually done at 2000° C. Oxide-boride composite ceramics have commonly been produced from ingredients corresponding to the crystalline phases in the composite: see for example U.S. Pat. Nos. 2,270,607, 3,067,146, 3,296,002, 4,022,584, 4,110,260 and 4,343,909.

Recently, U.S. patent application Ser. No. 454,671, T. de Angelis, as yet unpublished, has proposed an oxide-boride ceramic produced by reaction sintering whereby the ceramic consists essentially of a fine-grained, homogeneous interdispersion of 10-90 mole % of a boride phase and 10-90 mole % of an oxide phase. One example (body D) was a porous ceramic of titanium diboride and alumina of uniform grain structure (about 95 volume % of the grains of both oxide and boride phases were less than or equal to 7 micron while the largest grain was 10 micron) and with a density of 3.8 g/cc and 2.6% open porosity.

DISCLOSURE OF INVENTION

The invention provides a composite ceramic material of a group IVa metal diboride, preferably titanium diboride, and alumina which is an essentially non-porous body composed of the group IVa metal diboride and alumina in a 3:5 mole ratio and having a density exceeding 99% of the theoretical density, the body having a macroscopically uniform structure made up of microscopically non-uniformly dispersed grains of the group IVa metal diboride and alumina comprising:

(a) agglomerates of alumina of random shapes and dimensions, and (b) submicronic group IVa metal diboride in intimate wetting contact with the surfaces of the alumina agglomerates, the diboride forming a fibrous sponge-like electrically conductive structure.

A preferred method of producing this dense composite according to the invention comprises hot pressing a uniform reaction mixture of powders of the group IVa metal dioxide, boron oxide ($B_2O_3$) and aluminum in the molar ratio 3:3:10 and having a relatively coarse grain size between about 10 and 50 microns at a furnace temperature in the range of 1500°-1700° C. under an inert atmosphere with pressure being applied from below the point of fusion of aluminum (660° C.) and preferably from below the point of fusion of $B_2O_3$ (450° C.).

The reaction scheme is:

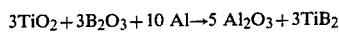

$3TiO_2 + 3B_2O_3 + 10\ Al \rightarrow 5\ Al_2O_3 + 3TiB_2$

This reaction is exothermic. Differential thermic analysis reveals that with the chosen granulometry of precursor powders, the reaction takes place between 730° C. and 1300° C. The melting points of $B_2O_3$ and Al are respecitively 450° C. and 660° C.; the melting point of $TiO_2$ is about 1850° C. It is believed that the specific microstructure and high density of the resulting composite are due to the progressive densification of the reaction mixture and reaction of the molten $B_2O_3$ and Al phases with the particulate $TiO_2$, by the application of pressure already from below the melting point of $B_2O_3$. Typically, the hot pressing is done at a furnace temperature of about 1600°-1650° C. for about 1 hour in an argon atmosphere. It is however believed that the local temperature in the reaction mixture may exceed 2000° C. due to the exothermic reaction, whereby the alumina phase has the appearance of fused alumina. A pressure of about 150-250 kg/cm$^2$ is preferably applied, but during heating up and cooling down it may be convenient to apply a lower pressure if a carbon die is used.

The grain size of the reactant powders is important; a relatively coarse grain size of the powders is recommended to avoid violent reactions and to provide a good end product. A grain size of about 1 micron or less would lead to excessively high local reaction temperatures which may require special arrangements for evacuation of the heat of reaction. A grain size above 100 microns is undesirable since it may lead to a macroscopically non-homogeneous product.

The resulting composite ceramic consists of 71 wt % $Al_2O_3$ and 29 wt % $TiB_2$ i.e. 74 vol % $Al_2O_3$ and 26 vol % $TiB_2$. The composite has a glassy appearance, but X-ray diffraction shows a crystalline $Al_2O_3$ and $TiB_2$ structure with no traces of $TiO_2$, $B_2O_3$ or Al. It is essentially non-porous i.e. no porosity is detectable within the measurement limit of up to 1% porosity. The theoretical density of the composite is calculated to be 4.08 g/cc. The measured density of the composite should be at least 99% of this value (i.e. at least 4.04 g/cc) and typically is about 4.07 g/cc.

The composite is wettable by molten aluminum, i.e. the $TiB_2$ induces wettability of the normally non-wettable alumina.

The composite has a very specific microstructure. The $TiB_2$ grains form a submicronic layer on the alumina agglomerates, but extend as a fibrous sponge-like structure on the surfaces of the agglomerates. When a uniaxial pressure is applied, the structure exhibits marked anisotropy with the $TiB_2$ fibers perpendicular to the pressing direction. In cross-section these $TiB_2$ filaments may extend for a length of 50-100 microns or more. In cross-section, the alumina agglomerates may also extend for a continuous (non-linear) length of 50-100 micron or more with transverse dimension varying from about 2-15 microns. These composites obtained by uniaxial pressing typically have an electrical conductivity between 20 and 30 times greater in the direction perpendicular to the compaction axis compared to the conductivity parallel to the compaction axis.

However, if isotropic composites are desired, this can be achieved by hot isostatic pressing.

The specific structure of the composite according to the invention is quite different from that of a body formed by sintering 71 wt % $Al_2O_3$, 29 wt % $TiB_2$ particles. Such sintered bodies retain a discrete particulate structure and are quite porous.

Also, when a body is prepared from the same reactants by reaction sintering without pressure, a 40% dense, 60% porous body is obtained with a different microstructure. Such porous bodies lack mechanical strength.

DRAWINGS

The single FIGURE of the drawings is a SEM micrograph, scale ×1000, showing the microstructure of the composite ceramic according to the invention.

The invention will be further illustrated in the following Example.

EXAMPLE

99% pure $TiO_2$ powder, 99% pure $B_2O_3$ powder and 99.5% pure aluminum powder, all of grain size −300 mesh (i.e. less than 44 microns) were mixed and milled for 48 hours in a polyethylene bottle containing alumina balls. The mixed powder was then placed in a carbon die of a hot-pressing system. The carbon parts in contact with the powder were painted with a dispersion of boron nitride to prevent formation of titanium carbide. A uniaxial pressure of 200 kg/cm$^2$ was applied and the temperature was raised to 1620° C. over 4½ hours, kept at 1620° C. for 1 hour and cooled at the same rate, under an Argon atmosphere.

The resulting dense $Al_2O_3$-$TiB_2$ composite ceramic had the following physical properties:

Density: 4.07 g.cm$^{-3}$
Porosity: <1%
Vickers Hardness (500 g): 2500 HV
Transverse Rupture Strength: 750 Newton.mm$^{-2}$
Thermal conductivity: $94.10^{-3}$ cal.cm$^{-1}$s$^{-1}$°C$^{-1}$ (parallel to compaction axis)
Electrical Conductivity:
  parallel to compaction axis: 8 ohm$^{-1}$ cm$^{-1}$
  perpendicular to compaction axis: 204 ohm$^{-1}$ cm$^{-1}$ The specific microstructure of the material is shown in the micrograph. Dark areas are the $Al_2O_3$ agglomerates. Light areas are the $TiB_2$ fibrous sponge like structure in perfect wetting contact with the surfaces of the $Al_2O_3$ agglomerates.

The structure of fibrous $TiB_2$ enveloping elongated random-shaped agglomerates of $Al_2O_3$ extends in three dimensions. The $TiB_2$ fibers are oriented perpendicular to the pressing direction.

The $Al_2O_3$-$TiB_2$ composite ceramic was immersed for 1000 hours in molten aluminum at 1000° C. in an argon atmosphere. The ceramic was well wetted by the molten aluminum and no trace of aluminum was found in the grain boundaries despite an observed change in the microstructure which changed to show a slight porosity.

INDUSTRIAL APPLICABILITY

A first application of this composite ceramic is in the field of aluminum electrowinning. Since it is wetted by molten aluminum, the material could be used as a cell component such as the base of a drained cathode, in direct contact with molten aluminum or supporting thin plates of pure titanium diboride. The boride phase with its low solubility in aluminum and the alumina phase will not contaminate the electrowon aluminum.

A second application of the ceramic is in the field of cutting tool technology. It is not recommended for steel cutting due to the formation of an iron-titanium eutectic. However, this hard ceramic would be suited for cutting soft metals, like aluminum.

A third application of the ceramic is in the field of armor materials. Presently, alumina and boride plates individually are used in armor vehicles as impact absorbers, and these could advantageously be replaced by the plates of the composite ceramic according to the illustration. The presence of boron atoms can also be favorable for neutron absorption.

The high neutron absorption of boron could also make the composite ceramic useful in the nuclear industry to slow down or absorb neutrons.

I claim:

1. A reaction sintered ceramic composite of group IVa metal diboride-alumina characterized in that it is an essentially non-porous body composed of group IVa metal diboride and alumina in a ratio of 3 mols of said diboride to 5 mols of alumina entirely formed by high temperature, elevated pressure exothermic reaction sintering of a 3:3:10 molar mixture of powders of group IVa metal dioxide: $B_2O_3$: aluminum, said body having a density at least 99% of the theoretical density and a macroscopically uniform structure made up of microscopically non-uniformly dispersed grains of the group IVa metal diboride and alumina predominantly in the form of:
  (a) bulky agglomerates of alumina of random shapes and dimensions, containing agglomerates having transverse dimension within the range from about 2 microns to about 15 microns while having continuous, non-linear dimension of at least about 50 microns, and
  (b) submicronic group IVa metal diboride in intimate wetting contact with the surfaces of the alumina agglomerates, the diboride forming a fibrous electrically conductive structure.

2. The composite of claim 1, wherein the group IVa metal is titanium.

3. The composite of claim 1 or 2, wherein the fibrous boride structure is oriented to provide anisotropic electrical conductivity.

* * * * *